United States Patent
Peng et al.

(10) Patent No.: US 10,258,935 B2
(45) Date of Patent: Apr. 16, 2019

(54) HIGH-FLUX POLYAMIDE COMPOSITE MEMBRANE

(71) Applicant: HUNAN OVAY TECHNOLOGY CO., LTD, Zhuzhou (CN)

(72) Inventors: Bo Peng, Zhuzhou (CN); Hongwei Lu, Zhuzhou (CN); Qunhui Hu, Zhuzhou (CN); Hui Yu, Zhuzhou (CN); Pan He, Zhuzhou (CN); Jin Wang, Zhuzhou (CN); Dan Liu, Zhuzhou (CN); Chunqing Wang, Zhuzhou (CN); Pengjun Liu, Zhuzhou (CN)

(73) Assignee: HUNAN OVAY TECHNOLOGY CO., LTD., Zhuzhou (CN)

( * ) Notice: Subject to any disclaimer, the term of this patent is extended or adjusted under 35 U.S.C. 154(b) by 76 days.

(21) Appl. No.: 15/616,913

(22) Filed: Jun. 7, 2017

(65) Prior Publication Data

US 2017/0266629 A1 Sep. 21, 2017

Related U.S. Application Data

(63) Continuation of application No. PCT/CN2015/090384, filed on Sep. 23, 2015.

(30) Foreign Application Priority Data

Dec. 15, 2014 (CN) .......................... 2014 1 0775101

(51) Int. Cl.
*B01D 69/06* (2006.01)
*B01D 69/12* (2006.01)
*B01D 71/56* (2006.01)

(52) U.S. Cl.
CPC ............. *B01D 71/56* (2013.01); *B01D 69/06* (2013.01); *B01D 69/12* (2013.01); *B01D 69/125* (2013.01)

(58) Field of Classification Search
None
See application file for complete search history.

(56) References Cited

U.S. PATENT DOCUMENTS

| 4,880,545 A | * | 11/1989 | Swamikannu | ....... B01D 69/125 |
| | | | | 210/654 |
| 4,948,506 A | * | 8/1990 | Lonsdale | ............. B01D 69/122 |
| | | | | 210/490 |

(Continued)

FOREIGN PATENT DOCUMENTS

| CN | 1724130 A | 1/2006 |
| CN | 1840230 A | 10/2006 |

(Continued)

*Primary Examiner* — Krishnan S Menon
(74) *Attorney, Agent, or Firm* — Wayne & Ken, LLC; Tony Hom

(57) ABSTRACT

The present invention provides a high-flux polyamide composite membrane, which includes a composite membrane body, wherein the composite membrane body includes a non-woven fabric, a porous supporting layer and a polyamide layer which are successively arranged; and the polyamide layer is prepared by a polyamine solution and a poly-acyl chloride solution through an interface polymerization reaction, wherein the polyamine solution contains amino acid. The amino acid adopted in the technical solution of the present invention can be used as an end-capping reagent to react with acyl chloride groups, thereby regulating a polyamide layer structure, decreasing a cross-linking degree of the polyamide layer, and opening a channel for the passing of water molecules; and moreover, the hydrophilic performance of a membrane surface can also be improved, and a water flux is increased while a high interception rate is ensured.

8 Claims, 2 Drawing Sheets

(56) References Cited

U.S. PATENT DOCUMENTS

| | | | |
|---|---|---|---|
| 5,160,619 A | 11/1992 | Yamaguchi et al. | |
| 5,254,261 A | 10/1993 | Tomaschke et al. | |
| 5,262,056 A * | 11/1993 | Koros | B01D 71/56 |
| | | | 210/500.33 |
| 6,171,497 B1 | 1/2001 | Hirose et al. | |
| 7,918,349 B2 * | 4/2011 | Mickols | B01D 61/025 |
| | | | 210/500.27 |
| 2015/0005530 A1 * | 1/2015 | Singh | B01D 61/007 |
| | | | 562/402 |

FOREIGN PATENT DOCUMENTS

| | | |
|---|---|---|
| CN | 101130155 A | 2/2008 |
| CN | 101569836 A | 11/2009 |
| CN | 101601975 A | 12/2009 |
| CN | 102438734 A | 5/2012 |
| CN | 103638832 A | 3/2014 |
| CN | 104437110 A | 3/2015 |
| EP | 2140929 A1 | 1/2010 |
| WO | 2013048126 A1 | 4/2013 |

\* cited by examiner

HIGH-FLUX POLYAMIDE COMPOSITE MEMBRANE

TECHNICAL FIELD

The present invention relates to the field of preparation of membranes, and in particular relates to a high-flux polyamide composite membrane.

BACKGROUND

As a most widely used composite membrane variety, a polyamide composite membrane has a structure formed by forming a polyamide separation layer on a non-woven polysulfone fabric supporting layer through an interface polymerization reaction (the interface polymerization reaction refers to polycondensation performed on an interface or at an organic phase side of an interface of two solutions which do not dissolve each other and respectively dissolve two monomers) (such as U.S. Pat. No. 5,160,619, CN1724130A, etc.). The polyamide composite membrane has the advantages of high interception rate, high flux, excellent chemical stability, wide range of pH values (4 to 11), low requirement for operating pressure and the like. Water flux is one of most important performance parameters of the polyamide composite membrane. The higher the water flux is, the lower the energy consumption for treating different amounts of liquid is. Although an energy utilization rate of large-sized water treatment apparatuses is continuously increased at present, nearly half of the cost is still limited to the consumed electric power. From the point of view of increasing the production efficiency and reducing the equipment operating cost, it is crucial to control the cost by reducing the energy consumption.

A compactness degree of an active separation layer of the polyamide composite membrane decides the performance of the composite membrane. The more compact the active separation layer is, the larger the resistance to the water molecules is, and the higher the interception capacity to salt ions is. Conversely, the looser the active separation layer is, the smaller the resistance to the water molecules is, and the lower the interception rate to the salt ions is. In order to increase the water flux of the polyamide composite membrane, the research personnel add different hydrophilic micromolecular additives into a water-phase reaction solution and an oil-phase reaction solution to promote the hydrolysis of poly-acyl chloride, thereby forming a loose active separation layer. For example, in U.S. Pat. Nos. 5,254,261 and 6,171,497, the water flux of the composite membrane is increased by adding amine salt and isopropanol into the polyamine aqueous solution. However, in the polyamide composite membrane, little addition amount of the traditional additives generates an unapparent effect on improving the membrane performance, while the large addition amount may influence the stability of the water-phase solution and the oil-phase solution, resulting in sharp reduction of the membrane performance.

Therefore, an invention of a polyamide composite membrane with high interception rate and high water yield is of great significance.

SUMMARY

An objective of the present invention is to provide a polyamide composite membrane which can ensure an excellent interception rate and also has a high flux. A main measure is as follows: an amino acid compound is added into a polyamine solution; the amino acid is used as an end-capping reagent to react with acyl chloride groups, thereby regulating the structure of a polyamide layer, decreasing a cross-linking degree of the polyamide layer, and opening a channel for the passing of water molecules; and meanwhile, carboxyl contained in the amino acid can improve the hydrophilicity of a membrane, and improve the water permeability of the membrane. A specific technical solution is as follows:

A high-flux polyamide composite membrane comprises a composite membrane body, wherein the composite membrane body comprises a non-woven fabric, a porous supporting layer and a polyamide layer which are successively arranged.

The polyamide layer is prepared by a polyamine solution and a poly-acyl chloride solution through an interface polymerization reaction, wherein the polyamine solution contains amino acid.

In the above technical solution, preferably, a chemical structural expression of the polyamide layer is as follows:

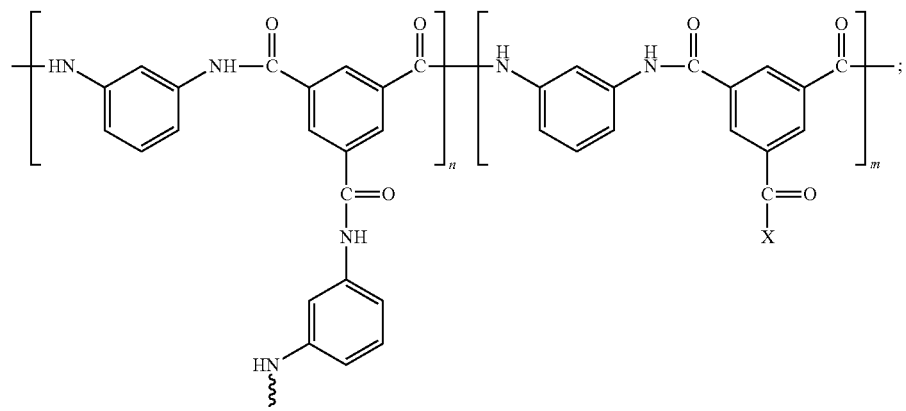

wherein X represents carboxyl or amino acid groups; m>0, n>0, and m+n=1.

In the above technical solution, preferably, the amino acid is at least one of alanine, valine, leucine, isoleucine, proline, phenylalanine, tryptophan, methionine, glycine, serine, threonine, cysteine, tyrosine, lysine, arginine, histidine, aspartic acid, glutamic acid, asparagine, and glutamine.

In the above technical solution, preferably, the amino acid is one or more of glycine, serine, lysine, arginine, and histidine.

In the above technical solution, preferably, a thickness of the polyamide layer is 50 to 300 nm.

In the above technical solution, preferably, the non-woven fabric, the porous supporting layer and the polyamide layer in the composite membrane body are successively arranged from bottom to top or from inside to outside; and the composite membrane body is a flat membrane, a hollow fiber membrane or a tubular membrane.

In the above technical solution, preferably, the content of the amino acid in the polyamine solution according to weight percent is 0.01% to 40%.

In the above technical solution, preferably, the content of the amino acid in the polyamine solution according to weight percent is 0.01% to 5%.

By adopting the technical solution, the present invention has the following beneficial effects.

(1) The polyamide layer in the high-flux polyamide composite membrane is prepared by the polyamine solution and the poly-acyl chloride solution through the interface polymerization reaction, wherein the polyamine solution contains the amino acid, and the amino acid is used as the end-capping reagent to react with the acyl chloride groups, thereby regulating the structure of the polyamide layer, decreasing the cross-linking degree of the polyamide layer, and opening the channel for the passing of the water molecules; and meanwhile, the carboxyl contained in the amino acid can improve the hydrophilicity of the membrane, and improve the water permeability of the membrane.

(2) The amino acid in the high-flux polyamide composite membrane is at least one of alanine, valine, leucine, isoleucine, proline, phenylalanine, tryptophan, methionine, glycine, serine, threonine, cysteine, tyrosine, lysine, arginine, histidine, aspartic acid, glutamic acid, asparagine, and glutamine and is preferably one or more of glycine, serine, lysine, arginine, and histidine, and the amino acid can decrease the cross-linking degree of the polyamide layer as far as possible and can improve the hydrophilicity of the membrane as far as possible, thereby improving the performance of the polyamide composite membrane.

(3) The thickness of the polyamide layer in the present invention is 20 to 100 nm, and the existing production method can be adopted to produce the membrane and also to ensure the quality of the membrane layer; and the composite membrane body is the flat membrane, the hollow fiber membrane or the tubular membrane, so that different demands can be met, and the practicability is high.

(4) The content of the amino acid in the polyamine solution according to weight percent in the present invention is 0.01% to 40% and preferably 0.01% to 5%, so that the cost can be saved as far as possible while the performance of the polyamide composite membrane is improved as far as possible, and the mass production is facilitated.

Besides the above-mentioned objective, features and advantages, the present invention also has other objectives, features and advantages. The present invention is further described below in detail with reference to the drawings.

BRIEF DESCRIPTION OF THE DRAWINGS

The accompanying drawings constituting a part of the present application are intended to provide a further understanding of the present invention, and exemplary embodiments of the present invention and descriptions thereof are intended to explain the present invention and are not to be construed as limitation to the present invention. In the accompanying drawings.

DETAILED DESCRIPTION

Embodiments of the present invention are described below in detail with reference to the drawings. However, the present invention can be implemented in various ways as defined and covered by claims.

Reference Embodiment

A polyamide composite membrane is prepared according to the following steps:

step 1: an amine solution is prepared specifically as follows: 240 g of m-phenylenediamine, 88 g of triethylamine, 184 g of camphorsulfonic acid and 8 g of sodium dodecyl sulfate are weighed and dissolved in 7480 g of water, and then uniformly stirred to obtain a polyamine water-phase solution;

step 2: an oil-phase solution is prepared specifically as follows: 8 g of trimesoyl chloride is dissolved in 7992 g of n-hexane and uniformly stirred to obtain an acyl chloride oil-phase solution; and step 3: the polyamide composite membrane is prepared specifically as follows: a prepared supporting membrane is immersed in the polyamine water-phase solution for 30 s, the water-phase solution remaining on the surface of the supporting membrane is removed by using a rubber roller, then the membrane is immersed in the acyl chloride oil-phase solution for 20 s, the residual oil-phase solution on the surface is removed, and then the membrane is put in a drying oven at 80° C. for 5 min to obtain the polyamide composite membrane.

Figure 1:
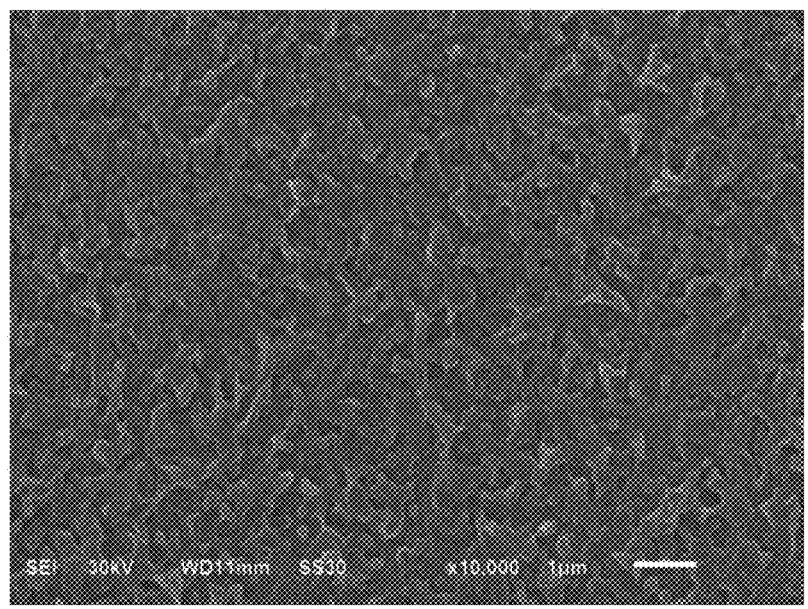
FIG. 1 is an electron micrograph of a polyamide composite membrane in a reference embodiment.

An electron micrograph of the polyamide composite membrane obtained above is shown in FIG. 1.

A membrane of the polyamide composite membrane obtained above is tested on a cross-flow membrane detection stand, and test conditions are as follows: a sodium chloride aqueous solution is 1500 ppm, the operating pressure is 150 psi, the test temperature is 25° C., the pH value is 6.5 to 7.5; and the test results are shown in Table 1.

Embodiment 1

A high-flux polyamide composite membrane comprises a composite membrane body, wherein the composite membrane body is a flat membrane and specifically comprises a non-woven fabric, a porous supporting layer and a polyamide layer which are successively arranged from bottom to top; and the polyamide layer is prepared by a polyamine solution and a poly-acyl chloride solution through an interface polymerization reaction, wherein the polyamine solution contains serine. The composite membrane body can also be designed as being formed by the non-woven fabric, the porous supporting layer and the polyamide layer which are successively arranged from inside to outside, and the composite membrane body can be specifically designed into a hollow fiber membrane or a tubular membrane.

A chemical structural expression of the polyamide layer is as follows:

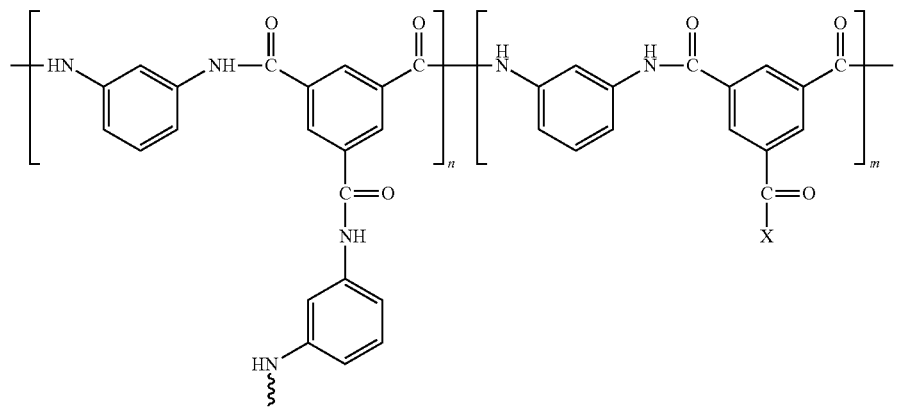

X represents to a —NHCH(COOH)CH$_2$OH group (a group obtained by removing a hydrogen from amino of the serine); m>0, n>0 and m+n=1.

A preparation process of the high-flux polyamide composite membrane is as follows:

step 1: a polyamine water-phase solution is prepared specifically as follows: 240 g of m-phenylenediamine, 7.2 g of serine, 88 g of triethylamine, 184 g of camphorsulfonic acid and 8 g of sodium dodecyl sulfate are weighed and dissolved in 7472.8 g of water, and then uniformly stirred to obtain a polyamine water-phase solution;

step 2: an acyl chloride oil-phase solution is prepared specifically as follows: 8 g of trimesoyl chloride is dissolved in 7992 g of n-hexane and uniformly stirred to obtain an acyl chloride oil-phase solution; and step 3: the polyamide composite membrane is prepared specifically as follows: (1) a supporting membrane is prepared, 80 g of PSF, 370 g of DMF and 50 g of PEG200 are weighed, mixed and prepared into 500 g of solution; the solution is stirred for 6 h at 75° C. and prepared into a uniformly-dispersed casting solution; and the casting solution is filtered and vacuum degassed and then uniformly smeared onto the non-woven fabric on membrane casting equipment, the thickness of a wet membrane is 180 μm, the wet membrane is vaporized for 3 s at a room temperature and then is immersed in ultra-pure water at 10° C. to be gelled and cured into a membrane, then the membrane is completely cured by normal-temperature water, and finally the membrane is treated for 3 min in the water at 75° C. to obtain the supporting membrane; and (2) the supporting membrane prepared in (1) is immersed in the polyamine water-phase solution obtained in step 1 for 30 s, the polyamine water-phase solution remaining on the surface of the supporting membrane is removed by using a rubber roller, then the membrane is immersed in the acyl chloride oil-phase solution obtained in step 2 for 20 s, the residual oil-phase solution on the surface is removed, then the membrane is put into a drying oven at 80° C. and kept in the drying oven for 5 min to obtain the high-flux polyamide composite membrane.

Figure 2:
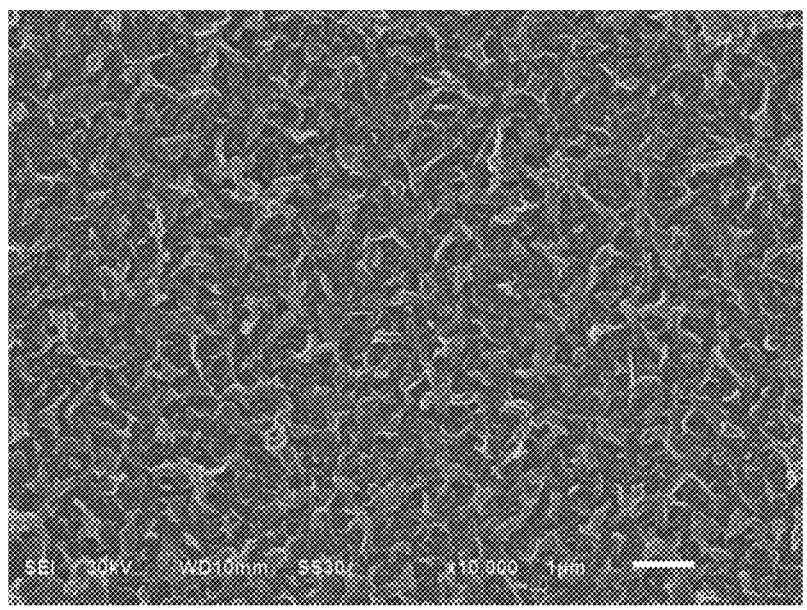
FIG. 2 is an electron micrograph of a high-flux polyamide composite membrane in a preferred embodiment 1 of the present invention.

It can be seen from the comparison between the electron micrograph (FIG. 2) of the high-flux polyamide composite membrane (embodiment 1) obtained from the technical solution of the present invention and the electron micrograph (FIG. 1) of a traditional polyamide composite membrane (reference embodiment) that the surface of the anti-pollution polyamide composite membrane (embodiment 1) of the present invention is looser than the surface of the traditional polyamide composite membrane (reference embodiment) and has a larger specific surface area, so that the high-flux polyamide composite membrane obtained through the technical solution of the present invention better facilitates the permeation of the water molecules.

A membrane is tested on a cross-flow membrane detection stand, and test conditions are as follows: a sodium chloride aqueous solution is 1500 ppm, the operating pressure is 150 psi, the test temperature is 25° C., and the pH value is 6.5 to 7.5, and the test results are shown in Table 1.

Embodiment 2

A high-flux polyamide composite membrane differs from embodiment 1 in that: (1) a polyamine water-phase solution is prepared specifically as follows: 240 g of m-phenylenediamine, 2.4 g of serine, 88 g of triethylamine, 184 g of camphorsulfonic acid and 8 g of sodium dodecyl sulfate are weighed and dissolved in 7477.6 g of water, and then uniformly stirred to obtain a polyamine water-phase solution; and (2) X in the chemical structural expression of the polyamide layer represents a —NHCH(COOH)CH$_2$OH group.

The surface of the high-flux polyamide composite membrane (embodiment 2) of the present invention is looser than the surface of the traditional polyamide composite membrane (reference embodiment) and has a larger specific surface area, thereby further facilitating the permeation of the water molecules.

A membrane is tested on a cross-flow membrane detection stand; and test conditions are as follows: a sodium chloride aqueous solution is 1500 ppm, the operating pressure is 150 psi, the test temperature is 25° C., and the pH value is 6.5 to 7.5, and the test results are shown in Table 1.

Embodiment 3

A high-flux polyamide composite membrane differs from embodiment 1 in that: (1) a polyamine water-phase solution is prepared specifically as follows: 240 g of m-phenylenediamine, 2.4 g of lysine, 88 g of triethylamine, 184 g of camphorsulfonic acid and 8 g of sodium dodecyl sulfate are weighed and dissolved in 7477.6 g of water, and then uniformly stirred to obtain a polyamine water-phase solution; and (2) X in the chemical structural expression of the polyamide layer represents a —NHCH(COOH)CH$_2$CH$_2$CH$_2$CH$_2$NH$_2$ group.

The surface of the high-flux polyamide composite membrane (embodiment 3) of the present invention is looser than the surface of the traditional polyamide composite membrane (reference embodiment) and has a larger specific surface area, thereby further facilitating the permeation of the water molecules.

A membrane is tested on a cross-flow membrane detection stand; and test conditions are as follows: a sodium chloride aqueous solution is 1500 ppm, the operating pressure is 150 psi, the test temperature is 25° C., and the pH value is 6.5 to 7.5, and the test results are shown in Table 1.

Embodiment 4

A high-flux polyamide composite membrane differs from embodiment 1 in that: (1) a polyamine water-phase solution is prepared specifically as follows: 240 g of m-phenylenediamine, 2.4 g of arginine, 88 g of triethylamine, 184 g of camphorsulfonic acid and 8 g of sodium dodecyl sulfate are weighed and dissolved in 7477.6 g of water, and then uniformly stirred to obtain a polyamine water-phase solution; and (2) X in the chemical structural expression of the polyamide layer represents —NHC(NH)NHCH$_2$CH$_2$CH$_2$CH(NH$_2$)COOH group.

The surface of the high-flux polyamide composite membrane (embodiment 4) of the present invention is looser than the surface of the traditional polyamide composite membrane (reference embodiment) and has a larger specific surface area, thereby further facilitating the permeation of the water molecules.

A membrane is tested on a cross-flow membrane detection stand; and test conditions are as follows: a sodium chloride aqueous solution is 1500 ppm, the operating pressure is 150 psi, the test temperature is 25° C., and the pH value is 6.5 to 7.5, and the test results are shown in Table 1.

Embodiment 5

A high-flux polyamide composite membrane differs from embodiment 1 in that: (1) a polyamine water-phase solution is prepared specifically as follows: 240 g of m-phenylenediamine, 2.4 g of histidine, 88 g of triethylamine, 184 g of camphorsulfonic acid and 8 g of sodium dodecyl sulfate are weighed and dissolved in 7477.6 g of water, and then uniformly stirred to obtain a polyamine water-phase solution; and (2) X in the chemical structural expression of the polyamide layer represents a —NHCH(COOH)CH$_2$C$_3$H$_3$N$_2$ group.

The surface of the high-flux polyamide composite membrane (embodiment 5) of the present invention is looser than the surface of the traditional polyamide composite membrane (reference embodiment) and has a larger specific surface area, thereby further facilitating the permeation of the water molecules.

A membrane is tested on a cross-flow membrane test stand, and test results are shown in Table 1.

Embodiment 6

A high-flux polyamide composite membrane differs from embodiment 1 in that: (1) a polyamine water-phase solution is prepared specifically as follows: 240 g of m-phenylenediamine, 2.4 g of glycine, 88 g of triethylamine, 184 g of camphorsulfonic acid and 8 g of sodium dodecyl sulfate are weighed and dissolved in 7477.6 g of water, and then uniformly stirred to obtain a polyamine water-phase solution; and (2) X in the chemical structural expression of the polyamide layer represents a —NHCH$_2$COOH group.

The surface of the high-flux polyamide composite membrane (embodiment 6) of the present invention is looser than the surface of the traditional polyamide composite membrane (reference embodiment) and has a larger specific surface area, thereby further facilitating the permeation of the water molecules.

A membrane is tested on a cross-flow membrane detection stand; and test conditions are as follows: a sodium chloride aqueous solution is 1500 ppm, the operating pressure is 150 psi, the test temperature is 25° C., and the pH value is 6.5 to 7.5, and the test results are shown in Table 1.

Embodiment 7

A high-flux polyamide composite membrane differs from embodiment 1 in that: (1) a polyamine water-phase solution is prepared specifically as follows: 240 g of m-phenylenediamine, 12 g of serine, 88 g of triethylamine, 184 g of camphorsulfonic acid and 8 g of sodium dodecyl sulfate are weighed and dissolved in 7468 g of water, and then uniformly stirred to obtain a polyamine water-phase solution; and (2) X in the chemical structural expression of the polyamide layer represents a —NHCH(COOH)CH$_2$OH group.

The surface of the high-flux polyamide composite membrane (embodiment 7) of the present invention is looser than the surface of the traditional polyamide composite membrane (reference embodiment) and has a larger specific surface area, thereby further facilitating the permeation of the water molecules.

A membrane is tested on a cross-flow membrane detection stand; and test conditions are as follows: a sodium chloride aqueous solution is 1500 ppm, the operating pressure is 150 psi, the test temperature is 25° C., and the pH value is 6.5 to 7.5, and the test results are shown in Table 1.

Embodiment 8

A high-flux polyamide composite membrane differs from embodiment 1 in that: (1) a polyamine water-phase solution is prepared specifically as follows: 240 g of m-phenylenediamine, 16.8 g of serine, 88 g of triethylamine, 184 g of camphorsulfonic acid and 8 g of sodium dodecyl sulfate are measured and dissolved in 7463.2 g of water, and then uniformly stirred to obtain a polyamine water-phase solution; and (2) X in the chemical structural expression of the polyamide layer represents a —NHCH(COOH)CH$_2$OH group.

The surface of the high-flux polyamide composite membrane (embodiment 8) of the present invention is looser than the surface of the traditional polyamide composite membrane (reference embodiment) and has a larger specific surface area, thereby further facilitating the permeation of the water molecules.

A membrane is tested on a cross-flow membrane detection stand; and test conditions are as follows: a sodium chloride aqueous solution is 1500 ppm, the operating pressure is 150 psi, the test temperature is 25° C., and the pH value is 6.5 to 7.5, and the test results are shown in Table 1.

Embodiment 9

A high-flux polyamide composite membrane differs from embodiment 1 in that: (1) a polyamine water-phase solution is prepared specifically as follows: 240 g of m-phenylenediamine, 24 g of serine, 88 g of triethylamine, 184 g of camphorsulfonic acid and 8 g of sodium dodecyl sulfate are measured and dissolved in 7456 g of water, and then uniformly stirred to obtain a polyamine water-phase solution; and (2) X in the chemical structural expression of the polyamide layer represents a —NHCH(COOH)CH$_2$OH group.

The surface of the high-flux polyamide composite membrane (embodiment 9) of the present invention is looser than the surface of the traditional polyamide composite membrane (reference embodiment) and has a larger specific surface area, thereby further facilitating the permeation of the water molecules.

A membrane is tested on a cross-flow membrane detection stand; and test conditions are as follows: a sodium chloride aqueous solution is 1500 ppm, the operating pressure is 150 psi, the test temperature is 25° C., and the pH value is 6.5 to 7.5, and the test results are shown in Table 1.

Embodiment 10

A high-flux polyamide composite membrane differs from embodiment 1 in that: (1) a polyamine water-phase solution is prepared specifically as follows: 240 g of m-phenylenediamine, 3.6 g of serine, 3.6 g of glycine, 88 g of triethylamine, 184 g of camphorsulfonic acid and 8 g of sodium dodecyl sulfate are measured and dissolved in 7472.8 g of water, and then uniformly stirred to obtain a polyamine water-phase solution; and (2) X in the chemical structural expression of the polyamide layer represents a —NHCH(COOH)CH$_2$OH or —NHCH$_2$COOH group.

The surface of the high-flux polyamide composite membrane (embodiment 10) of the present invention is looser than the surface of the traditional polyamide composite membrane (reference embodiment) and has a larger specific surface area, thereby further facilitating the permeation of the water molecules.

A membrane is tested on a cross-flow membrane detection stand; and test conditions are as follows: a sodium chloride aqueous solution is 1500 ppm, the operating pressure is 150 psi, the test temperature is 25° C., and the pH value is 6.5 to 7.5, and the test results are shown in Table 1.

Embodiment 11

A high-flux polyamide composite membrane differs from embodiment 1 in that: (1) a polyamine water-phase solution is prepared specifically as follows: 240 g of m-phenylenediamine, 3.6 g of serine, 3.6 g of arginine, 88 g of triethylamine, 184 g of camphorsulfonic acid and 8 g of sodium dodecyl sulfate are weighed and dissolved in 7472.8 g of water, and then uniformly stirred to obtain a polyamine water-phase solution; and (2) X in the chemical structural expression of the polyamide layer represents a —NHCH(COOH)CH$_2$OH or —NHC(NH)NHCH$_2$CH$_2$CH(NH$_2$)COOH group.

The surface of the high-flux polyamide composite membrane (embodiment 11) of the present invention is looser than the surface of the traditional polyamide composite membrane (reference embodiment) and has a larger specific surface area, thereby further facilitating the permeation of the water molecules.

A membrane is tested on a cross-flow membrane detection stand; and test conditions are as follows: a sodium chloride aqueous solution is 1500 ppm, the operating pressure is 150 psi, the test temperature is 25° C., and the pH value is 6.5 to 7.5, and the test results are shown in Table 1.

Table 1 is a table of comparison of performance of the polyamide composite membrane of the reference embodiment and the high-flux polyamide composite membrane of embodiment 1 to embodiment 11 of the present invention

| Embodiment | amino acid type | amino acid concentration (%) | water flux (gfd) | desalting rate (%) |
|---|---|---|---|---|
| reference embodiment | 0 | 0 | 20.1 | 99.32 |
| embodiment 1 | serine | 0.09 | 38.42 | 99.17 |
| embodiment 2 | serine | 0.03 | 35.66 | 99.21 |
| embodiment 3 | lysine | 0.03 | 30.02 | 99.10 |
| embodiment 4 | arginine | 0.03 | 33.17 | 99.19 |
| embodiment 5 | histidine | 0.03 | 32.01 | 99.11 |
| embodiment 6 | glycine | 0.03 | 33.20 | 98.50 |
| embodiment 7 | serine | 0.15 | 40.12 | 98.63 |
| embodiment 8 | serine | 0.21 | 46.39 | 97.37 |
| embodiment 9 | serine | 0.30 | 51.17 | 95.21 |
| embodiment 10 | serine glycine | 0.045 0.045 | 35.38 | 99.09 |
| embodiment 11 | serine arginine | 0.045 0.045 | 37.98 | 98.19 |

It can be seen from Table 1 that compared with the existing polyamide composite membrane (reference embodiment), in the present invention, only 0.03% of amino acid is added in the polyamine solution, the water flux of the polyamide composite membrane is increased by 50% to 75%, while a salt interception rate is decreased slightly; and as the content of the amino acid in the polyamine solution is increased, the interception rate of the polyamide composite membrane presents a decreasing trend, while the water flux presents a rising trench. Therefore, the polyamide composite membrane of the present invention (embodiment 1 to embodiment 11) has a higher water flux, and has the advantages of saving the investment, reducing the energy consumption, increasing the treatment efficiency and the like. Besides that the polyamide composite membrane of the present invention is applied to the field of liquid filtering, the wide application of the polyamide composite membrane can be conveniently extended.

The above descriptions are only preferred embodiments of the present invention, rather than being used for limiting the present invention. Those skilled in the art should understand that the present invention may have a variety of modifications and changes. Any modification, equivalent replacement, improvement and the like made within the spirit and the principle of the present invention shall be included in the protection scope of the present invention.

What is claimed is:

1. A high-flux polyamide composite membrane, comprising a composite membrane body, wherein the composite membrane body comprises a non-woven fabric, a porous supporting layer and a polyamide layer which are successively arranged; and the polyamide layer is prepared by a polyamine solution and a poly-acyl chloride solution through an interface polymerization reaction, wherein the polyamine solution contains amino acid;

wherein a chemical structural expression of the polyamide layer is as follows:

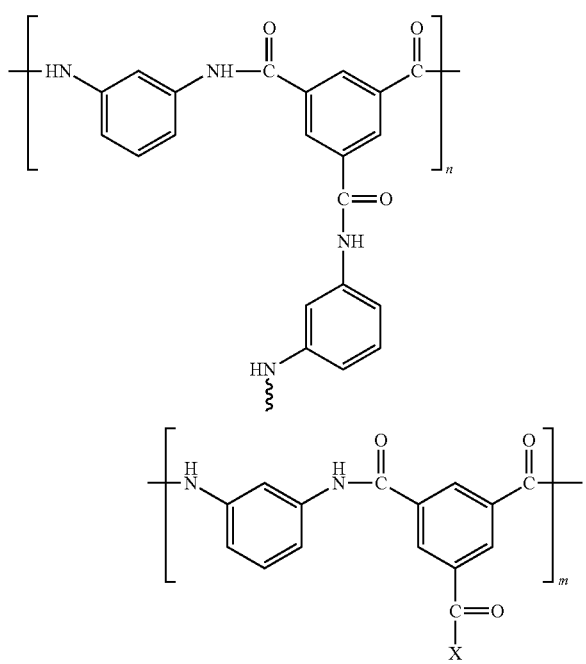

wherein X represents carboxyl or amino acid groups; m>0, n>0, and m+n=1.

2. The high-flux polyamide composite membrane according to claim 1, wherein the amino acid is at least one of alanine, valine, leucine, isoleucine, proline, phenylalanine, tryptophan, methionine, glycine, serine, threonine, cysteine, tyrosine, lysine, arginine, histidine, aspartic acid, glutamic acid, asparagine, and glutamine.

3. The high-flux polyamide composite membrane according to claim 2, wherein the amino acid is one or more of glycine, serine, lysine, arginine, and histidine.

4. The high-flux polyamide composite membrane according to claim 1, wherein a thickness of the polyamide layer is 50 to 300 nm.

5. The high-flux polyamide composite membrane according to claim 1, wherein the non-woven fabric, the porous supporting layer and the polyamide layer in the composite membrane body are successively arranged from bottom to top or from inside to outside.

6. The high-flux polyamide composite membrane according to claim 5, wherein the composite membrane body is a flat membrane, a hollow fiber membrane or a tubular membrane.

7. The high-flux polyamide composite membrane according to claim 1, wherein the content of the amino acid in the polyamine solution according to weight percent is 0.01% to 40%.

8. The high-flux polyamide composite membrane according to claim 7, wherein the content of the amino acid in the polyamine solution according to weight percent is 0.01% to 5%.

* * * * *